United States Patent [19]

Lu

[11] Patent Number: 5,896,422
[45] Date of Patent: Apr. 20, 1999

[54] METHOD AND APPARATUS FOR DETERMINING THE DETECTION THRESHOLD FOR AN INFORMATION SIGNAL

[75] Inventor: Keh-Shehn Lu, San Diego, Calif.

[73] Assignee: Uniden San Diego Research and Development Center, Inc., San Diego, Calif.

[21] Appl. No.: 08/813,803

[22] Filed: Mar. 6, 1997

[51] Int. Cl.[6] .................................................. H04L 25/06
[52] U.S. Cl. .................................... 375/317; 375/355
[58] Field of Search ........................ 375/272, 279, 375/282, 283, 317, 329, 330, 333, 334, 336, 355, 361; 329/300, 304; 341/68

[56] References Cited

U.S. PATENT DOCUMENTS

| | | | |
|---|---|---|---|
| 4,242,755 | 12/1980 | Gauzan | 375/342 X |
| 4,567,602 | 1/1986 | Kato et al. | 375/296 |
| 5,052,021 | 9/1991 | Goto et al. | 375/371 |
| 5,671,256 | 9/1997 | Clark et al. | 375/342 |

*Primary Examiner*—Young T. Tse
*Attorney, Agent, or Firm*—Hoffmann & Baron, LLP

[57] ABSTRACT

A method for setting a bit determination threshold for determining the logic state of a bit in a data bit stream of an NRZ (non-return-to-zero) signal in a GMSK (gaussian minimum shift keying) communication system includes the step of sensing the occurrence of a "flat top" bit in the data bit stream, which signifies the occurrence of a first string of successive same state bits in the data bit stream, where the bits are in a first logic state, such as logic 1. The average bit amplitude of the information signal corresponding to the "flat top" bit of the first string is determined. The occurrence of a second "flat top" bit in the data bit stream which signifies the occurrence of a second string of successive same state bits which are of an opposite logic state, such as logic 0, is then sensed, and the average bit amplitude of the second "flat top" bit of the second string is determined. The average bit amplitude of the first "flat top" bit of the first string is averaged with the average bit amplitude of the second "flat top" bit of the second string to determine a threshold level which is used in setting a bit determination threshold. A circuit for carrying out this method may be in the form of a programmable DSP (digital signal processor).

13 Claims, 6 Drawing Sheets

METHOD AND APPARATUS FOR DETERMINING THE DETECTION THRESHOLD FOR AN INFORMATION SIGNAL

BACKGROUND OF THE INVENTION

1. Field of the Invention

This invention relates generally to digital communications, and more specifically relates to the proper determination of transmitted digital data signals, in particular, non-return-to-zero (NRZ) signals.

2. Description of the Prior Art

It is generally known to set the threshold for determining the state of antipodal information symbols based on averaging the received data, a baseband signal, over a relatively long period of time, for example, 200 bit periods or more. The longer the averaging period is, a more precise threshold may be realized. Such a rule may be suitable for many types of modulation, including frequency shift keying (FSK), quadrature phase shift keying (QPSK), offset quadrature phase shift keying (OQPSK) and minimum shift keying (MSK).

Gaussian minimum shift keying (GMSK) and gaussian frequency shift keying (GFSK) modulation techniques are becoming more prevalent in communication systems because of their resultant increased spectral efficiency. Such modulators are implemented by using a premodulation gaussian low-pass filter in the baseband processor of an MSK or FSK modulator, and to which is provided a balanced NRZ data signal. An example of a GMSK modulator is disclosed in U.S. Pat. No. 4,567,602 to Kamilo Feher.

One of the problems associated with use of a gaussian low-pass pre-filter is that it has a "memory" or energy storage effect such that the swing and, thus, the negative and positive amplitudes of the NRZ received data signal are affected. The effect of the gaussian pre-filter in a GMSK system is shown in FIG. 1. The swing and peak amplitudes of the transmitted signal are clearly affected particularly when successive bits alternate in sign (i.e., polarity).

Over long periods of time, this should not have a deleterious effect on the threshold determination, conventionally done by averaging consecutive bits of the received data stream. But for shorter averaging periods, where the probability of equal antipodal excursions of data decreases, and the probability of equal antipodal excursions of data pattern decrease further, the bit determination threshold may be significantly affected. Thus, the gaussian pre-filter in a GMSK or GFSK modem further limits the ability to accurately determine the threshold over fewer bit periods than is conventionally done.

OBJECTS AND SUMMARY OF THE INVENTION

It is an object of the present invention to provide a method and apparatus for determining the threshold used for determining the state of antipodal information symbols.

It is another object of the present invention to provide a method for accurately setting the threshold used for determining the state of antipodal information symbols in a relatively shorter period of time than done conventionally.

It is a further objection of the present invention to provide a method and apparatus for determining accurately and relatively quickly the threshold used for bit state determination of a received NRZ signal in a GMSK or GFSK demodulator.

It is still a further object of the present invention to provide a method and apparatus which allows for the adaptive adjustment of the bit state determination threshold with relatively few samples of the data bit stream of a received signal.

It is yet another object of the present invention to provide a method and apparatus for threshold determination in a digital communication modem which overcomes the inherent disadvantages of known threshold setting techniques.

In accordance with one form of the present invention, the received NRZ signal is analyzed by a programed digital signal processor (DSP) or discrete circuits to determine if there are strings of successive logic 1's or 0's (i.e., +1, +1, or −1, −1, for antipodal signals) in the received data bit stream signal. It has been determined that the gaussian pre-filter in the GMSK or GSFK modem dissipates its retained energy after successive symbols of the same state, that is, after two, three or more logic 1's in a row or two, three or more logic 0's in a row, so that a full swing and maximum amplitudes are achieved by the NRZ signal. The threshold voltage level is set by averaging only the amplitudes of full swing excursions of the NRZ signal determined by the previous step. This threshold level is preferably updated and reset every time another full swing excursion is detected, so that the threshold may be said to be adaptively set.

In accordance with the present invention, only bits with sufficiently "flat tops" are determined to constitute part of a string of successive logic 1 or 0 states, which thereafter yield a full amplitude swing of the NRZ signal. These "flat top" bits are determined in the following manner:

Each bit (i.e., symbol) of the data bit stream of the received NRZ signal is sampled a predetermined number of times, and the amplitudes of the signal at each sample are stored in the memory of the DSP. The amplitudes of each sample for a specific period of time, for example, one bit period, are summed together and averaged by the DSP to derive an average bit amplitude. The derivatives of each sample of the NRZ signal, with respect to time, are also determined by the DSP. The derivatives correspond to the instantaneous (or incremental) slope of the NRZ signal at each sample time.

The derivatives of each sample are preferably determined by the DSP by averaging successive sample amplitudes, that is, by finding the absolute value of the difference in amplitudes of one sample of the NRZ signal with the next sample and dividing by the sample period. Again, this step may be performed by the DSP.

The DSP (or discrete circuits) next sums the derivatives over the same period for which the sample amplitudes were summed, for example, one bit period, to determine an average bit slope. The averaged sum of the sample amplitudes of the NRZ signal (i.e., the average bit amplitude) is then compared with the averaged sum of the absolute values of the derivatives (i.e., the average bit slope), preferably using a scaling factor, K, that is:

$$\text{averaged}\Sigma\text{amplitudes} \geq K \times \text{averaged}\Sigma|\text{derivatives}|$$

or expressed another way, $$\text{average bit amplitude} \geq K \times \text{average bit slope}$$

When this equation is satisfied for the specific period of time mentioned previously, for example, one symbol, it is determined that a sufficiently "flat top" pulse or portion of the NRZ signal has occurred, i.e., there is a string of successive, same state bits (1's or 0's) in the data bit stream of the NRZ signal. The energy in the guassian filter has dissipated after the occurrence of this successive, same state bit string which gave rise to the flat top in the signal, and a determination of the signal threshold is now made.

The scaling factor, K, is determined, and continually adjusted, in accordance with the probability of occurrence of recurring strings of a predetermined number of successive 1's or 0's in the received NRZ signal over a predetermined period of time. In order to determine the proper scaling factor, K, the GMSK or GFSK demodulator detects and counts the number of times that a "flat top" symbol (which signals the occurrence of a string of same state bits) actually occurs over the same time period. If too few "flat top" symbols (identifying such strings) are detected than expected according to probability, then the scaling factor, K, is lowered. If too many "flat top" symbols (identifying same state strings) are detected than expected, then the scaling factor, K, is increased. The scaling factor is adjusted to give the proper detection of successive recurring logic 1's or 0's in view of noise affecting the received signal.

As mentioned previously, when a string of successive 1's or 0's is detected in the data bit stream (i.e., the NRZ signal), the average amplitude of the signal is measured by the demodulator. This measurement is averaged with the most recent previous average amplitude measurement of opposite polarity by the DSP to determine a new threshold setting. This threshold is adjusted by the demodulator and used to determine the logic state of the data bit stream of the received NRZ signal.

A programmed DSP, discrete circuits or an ASIC (Application Specific Integrated Circuit) may be used in accordance with the invention to carry out the process described previously. It is envisioned that the ASIC or discrete circuits may include a first summer to sum together the sample amplitudes of the NRZ signal, a first averager, which averages this sum to determine the average bit amplitude, a derivator, which takes the derivative of each of the signal samples, such as in the manner described previously, a second averager, which adds together and averages the derivatives computed by the derivator to determine the average bit slope, and a memory, such as a register circuit, into which is stored the sampled amplitudes of the NRZ signal, the sums and/or average of the amplitudes (i.e., the average bit amplitudes) and the averaged sums of the derivatives (i.e., the average bit slopes).

The ASIC or discrete circuits may further include a first comparator, which compares the average bit amplitude with the average bit slope (multiplied by the scaling factor K), a microprocessor, which determines the number of "flat top" symbols (each indicating a string of successive same state bits) in a predetermined period of time, and a second comparator which compares this number to a probability factor (corresponding to the expected number of same bit strings in this same time period). The second comparator then adjusts the scaling factor K accordingly.

The ASIC or discrete circuits may further include a threshold averaging circuit, which takes selected measured amplitudes of the NRZ signal at adjacent bit strings of opposite polarity and averages them together to determine a new threshold voltage. The new threshold voltage is provided to a bit detection circuit in the signal demodulator.

These and other objects, features and advantages of this invention will become apparent from the following detailed description of illustrative embodiments thereof, which is to be read in connection with the accompanying drawing.

DETAILED DESCRIPTION OF THE PREFERRED EMBODIMENTS

Figure 1:
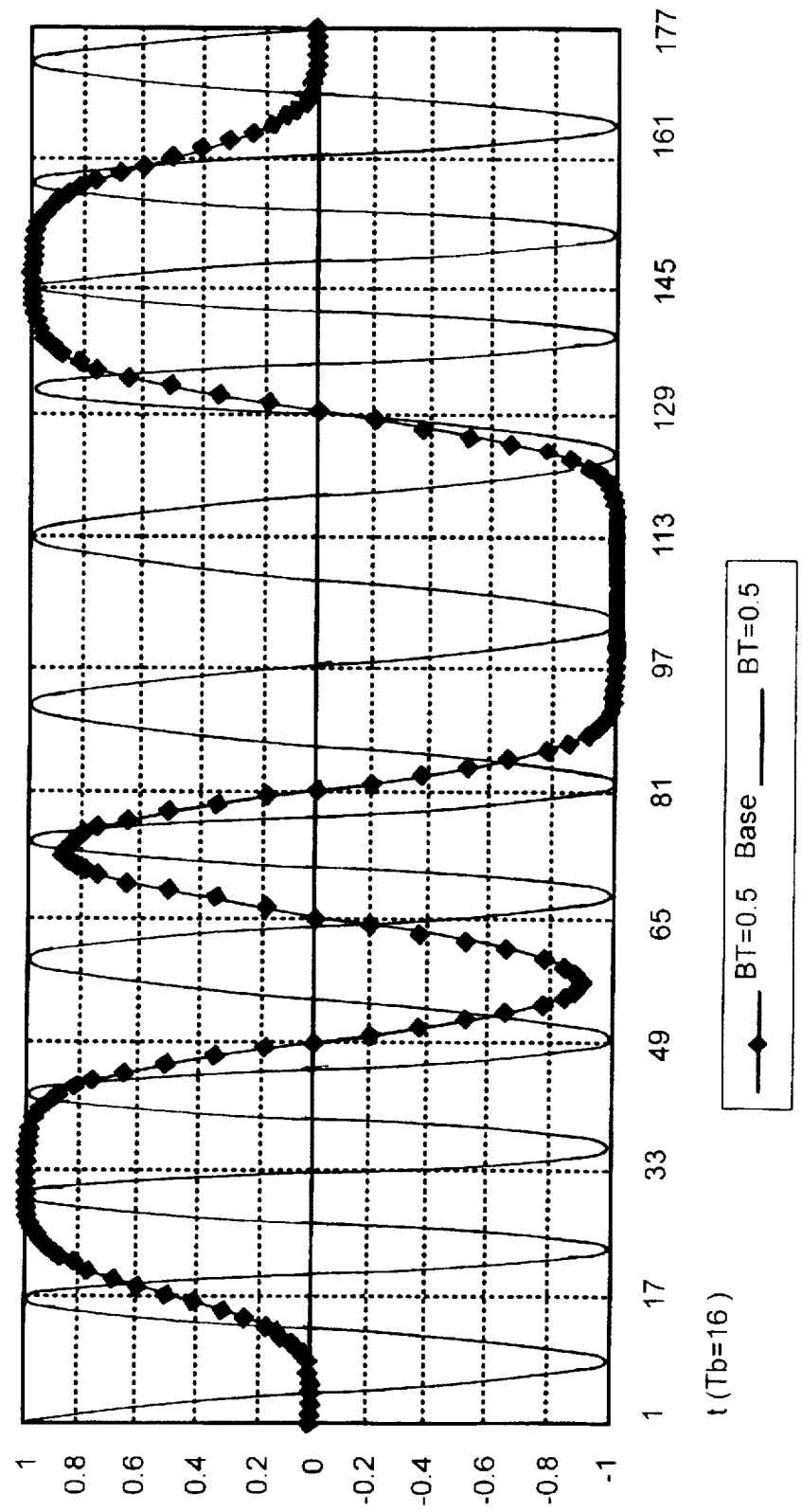
FIG. 1 is a computer generated graph of a GMSK received signal, without noise, overlaid on a carrier signal, provided for illustrating one form of a method for determining the detection threshold for a digital data signal in accordance with the present invention.

Referring initially to FIG. 1 of the drawings, a computer simulation of a GMSK received signal, without noise, is graphically illustrated and overlaid on a GMSK modulated carrier signal. The carrier frequency, $f_c$, is equal to $1/T$, where T represents the bit period. The BT product for the computer simulation equals 0.5, where B represents the 3 dB bandwidth of the gaussian pre-filter, and T, as mentioned previously, represents the bit duration.

For purposes of facilitating an understanding of the invention, the computer simulation is set up with 16 samples taken during each bit period. Each sample of the received signal is illustrated as occurring at a solid rhomboid mark superimposed on the line depicting the received signal. The x ordinate of the graph of FIG. 1 illustrates the time in sample periods so that the first bit is shown between samples 1 through 16, the next bit is shown between 17 and 32, etc. The division between bit periods is illustrated by vertical lines in FIG. 1. The y ordinate represents the amplitude of the received signal, which may be in volts. A maximum amplitude of ±1 is chosen to facilitate a description of the invention.

The received data signal illustrated by FIG. 1 is antipodal in that it extends between +1 and −1 in amplitude, and represents a typical NRZ (non-return-to-zero) signal. As can be seen from FIG. 1, the received data stream, starting at sample 17, is sequentially +1, +1, −1, +1, −1, −1, −1, +1 and +1, where +1 represents a positive excursion of the received signal, corresponding to a "1" logic state, and −1 represents a negative excursion of the received signal, corresponding to a "0" logic state.

One of the purposes of the invention is to provide a method for adaptively determining and setting the threshold level which is used in determining the logic state of the data bit stream received by the demodulator of a GMSK or GFSK system or any other system which employs a gaussian pre-filter. One of the problems with a gaussian pre-filter is that it has, effectively, a "memory" and exhibits a capacitive or inductive energy storage effect in that it affects the swing of antipodal signals, such as NRZ data signals, provided to it, at least until the energy stored in the filter has dissipated.

Depending upon the structure of the pre-filter and, of course, the width of the bit period, the energy in the filter may dissipate after two, three or more bit periods. If the energy in the pre-filter has not dissipated, the swing or excursion of the received data signal may be limited. This is illustrated in FIG. 1 of the drawing with the −1 bit followed by the +1 bit shown between samples 49 and 64 and 65 and 80, respectively. It should be noted that the negative and positive swings of the antipodal (in this case, NRZ) signal, does not reach the maximum amplitude of +1 and −1. Such limited swings would affect the setting of the threshold used for determining the logic state of each bit of the data bit stream unless an extremely high number of bits were sampled in making the threshold determination.

Referring again to FIG. 1, a string of repetitive −1 bits of the received data signal is illustrated between samples 81 and 128, thereby occupying three successive bits. It should be noted that the next bit in the sequence of data bits is +1 (between sample 129 and 144 in FIG. 1), and that a full swing of the received NRZ signal from −1 to +1 occurs. This full swing is the result of the energy in the gaussian pre-filter having dissipated prior to the transition in the NRZ signal from one logic state to another (i.e., from −1 to +1, for an antipodal signal). In accordance with the method of the present invention, only those repetitive same-state sequences in the data bit stream which are long enough to allow the energy in the pre-filter to dissipate are used in the determination of the threshold level; sequences of bits which do not result in a full swing, such as between samples 49 and 80, are not used in setting the threshold. Stated another way, only bits which exhibit (and satisfy the criterion to be considered as having) a sufficiently "flat top" are used in setting the threshold. Such "flat top" bits signify that a string of successive, same state bits has occurred.

The method of determining which bits of the data bit stream form a string of successive, same state bits used for setting the bit determination threshold, in accordance with the present invention, will now be described. To facilitate an understanding of the invention, it will be assumed that the energy in the gaussian pre-filter will have only dissipated after a string of three successive same state bits in the data bit stream, although, as mentioned previously, the energy in the pre-filter may have dissipated after two or four or more successive same state bits, depending upon the configuration of the pre-filter.

In accordance with the present invention, each bit of the data bit stream (i.e., the received NRZ signal) is sampled 16 times. This is an illustrative number and, theoretically, more samples per bit to as few as two samples per bit are possible. Also, it may not be known when each bit (i.e., symbol) begins. Therefore, it may be necessary, especially in the beginning of the procedure when there may be no information as to symbol timing, to begin sampling the NRZ signal starting at an arbitrary point in time and continuing at the selected sampling rate.

With each sample, the amplitude of the NRZ signal is measured. For example, the amplitude of the NRZ signal for the 17th sample is 0.5. For the 18th sample, the amplitude is 0.59. Again, for illustrative purposes, the amplitudes measured from the NRZ signal shown in FIG. 1 are set forth in Table 1 below:

TABLE 1

| Sample | Amplitude |
| --- | --- |
| 17th | .5 |
| 18th | .59 |
| 19th | .68 |
| 20th | .75 |
| 21st | .82 |
| 22nd | .86 |
| 23rd | .9 |
| 24th | .92 |
| 25th | 1.0 |
| 26th | 1.0 |
| 27th | 1.0 |
| 28th | 1.0 |
| 29th | 1.0 |
| 30th | 1.0 |
| 31st | 1.0 |
| 32nd | 1.0 |

Again, there are 16 samples of amplitude taken for each bit of the NRZ signal. The amplitudes for the 16 samples over one bit duration are summed together. In the example given above, this equals 14.02. In one form of the method, the average of the amplitudes over one bit period may be determined. This defines the average bit amplitude. In the example given above, this average bit amplitude is computed by taking the derived sum of the amplitudes, 14.02, and dividing the sum by the number of samples per symbol, 16, which results in 0.87625. It is not absolutely necessary to divide the sum of the amplitudes by 16, because the scaling factor, K, may be appropriately increased in magnitude to compensate for this.

Next, in accordance with the present invention, the derivatives of the NRZ signal taken at each sample are determined. The derivatives correspond to the instantaneous slope at the sample times or, alternatively, the incremental slope of the NRZ signal between adjacent samples.

To determine the derivatives of the NRZ signal for the first bit situated between samples 17 and 32, the amplitude of the NRZ signal for the 17th sample is subtracted from the amplitude measured at the 18th sample, in other words, 0.59 minus 0.50, or 0.09. This difference is divided by Δx, which is the incremental change in the x coordinate of the graph of FIG. 1, or in this case, 1/16 of a bit period. Accordingly, the difference 0.09, divided by 1/16, yields a derivative value of 1.44 for the 17th sample. Again, as is seen, it may also not be necessary to divide the difference by 1/16, as this may be factored into the equation for determining a "flat top" pulse either in the scaling factor, K, or on the opposite side of the equation.

To determine the derivative for the 18th sample, the 18th sample amplitude, 0.59, is subtracted from the 19th sample amplitude, 0.68, to also yield 0.09, which is then divided by the sample period or 1/16, to yield 1.44. The derivatives for the remaining samples are calculated in a similar manner. Table 2 sets forth the derivatives for each of the samples of the NRZ signal, for the first bit of the sequence shown in FIG. 1, as shown below:

TABLE 2

| Sample | Derivative |
|---|---|
| 17th | 1.44 |
| 18th | 1.44 |
| 19th | 1.12 |
| 20th | 1.12 |
| 21st | .64 |
| 22nd | .64 |
| 23rd | .32 |
| 24th | 1.28 |
| 25th | 0 |
| 26th | 0 |
| 27th | 0 |
| 28th | 0 |
| 29th | 0 |
| 30th | 0 |
| 31st | 0 |
| 32nd | 0 |

The incremental derivatives for one bit period are then summed together and divided by the number of sample periods in one bit, that is, 16 in this example, to derive the average bit slope (the step of dividing by 16 may also be omitted and appropriately compensated for in the scaling factor or by not dividing the sum of the sample amplitudes by 16). In the example given above, this results in 8 divided by 16, or 0.5. This provides an average slope for the NRZ signal over one bit period between samples 17 and 32.

The next step in the method of the present invention is to compare, for each bit period, the averaged sum of the sampled amplitudes (i.e., the average bit amplitude) with the averaged sum of the absolute values of the derivatives (i.e., the average bit slope) of the NRZ signal multiplied by a scaling factor, K, which can be an integer or fraction, in other words:

$$averaged \Sigma amplitudes \geq averaged \Sigma |derivatives| \times K$$

or expressed another way, $$average\ bit\ amplitude \geq average\ bit\ slope \times K$$

The scaling factor, K, is a number which is determined, and continually adjusted, in accordance with the probability of occurrence of strings successive 1's or 0's in the received NRZ signal over a predetermined period of time. Assume, for example, that it has been determined that the gaussian pre-filter dissipates its energy after a string of a predetermined number of same state bits in the data bit stream. Only bits exhibiting a substantially "flat top" by satisfying the equation set forth above, that is, the averaged sum of the sampled amplitudes (i.e., the average bit amplitude) is greater or equal to the averaged sum of the absolute value of the sample deviations (i.e., the average bit slope) multiplied by the scaling factor, K, are considered as part of a string of bits that will be used in setting the bit determination threshold.

Say, for example, the scaling factor, K, is set to 100, and that three successive same state logic bits in the bit data stream of the NRZ signal are being searched to provide the "flat top" in the NRZ signal which assures that the gaussian pre-filter has completely dissipated its energy before a determination of the proper threshold level is made. According to probability, a string of three successive same state logic bits, either all 1's or all 0's, should occur in a 100 bit sequence in the data bit stream 24.5 times. This figure is calculated by taking the number of bits (i.e., 100), subtracting 2 and dividing this number by 4. It should be kept in mind that strings may overlap one another. For example, four successive logic 1 bits contains two strings of three logic 1 bits. If it is found that with a scaling factor, K, of 100, in a 100 bit sample, only 10 strings of three successive same state bits are detected, then it is known that the initial setting of 100 for the scaling factor, K, is too restrictive to satisfy the equation above, and that fewer "flat tops" are being detected than are expected (through probability). The scaling factor, K, is then adjusted to a less stringent number, such as 80.

With a scaling factor, K, now set at 80, for example, suppose there were 30 strings of three successive same state bits detected in a 100 bit data sequence, instead of the 24.5 number of strings expected through probability. This would indicate that the scaling factor, K, is too low and too many "flat top" pulses in the NRZ signal are being detected. The scaling factor, K, would then be increased to 90, for example. The scaling factor, K, is continually adjusted so that, for every 100 bits of the data bit stream, there will occur approximately 24.5 strings of three successive same state bits in the data bit stream.

The example using three successive same state bits is, of course, for illustrative purposes only. It may be determined that, with the particular type of pre-filter used in the system, the energy in the filter is dissipated after two successive same state bits in the data bit stream of the NRZ signal. If this is the case, meaning that two bit, "flat top" pulses or sections are to be detected in the NRZ signal, then the scaling factor, K, is appropriately set based on the actual number of two bit, same state strings detected over a predetermined number of bits, and compared to the number of two bit, same state strings expected based on probability. The scaling factor, K, is continually increased and decreased to assure that the number of "flat tops" detected approximate the number expected through probability.

The detection of "flat tops" in the NRZ signal will be used in the determination of the proper threshold used in the demodulator in determining the logic state of each bit in the data bit stream of the NRZ signal. Only "flat top" pulses in the NRZ signal are used in making this determination; all other pulses, where the average bit amplitude is less than the average bit slope times K, are disregarded. The setting of the threshold will now be described in detail.

For illustrative purposes, reference is again made to the signal shown in FIG. 1 of the drawing. Say, for example, an acceptable "flat top" pulse in the NRZ signal defined by bits which satisfy the criteria set forth by the equation given previously (averaged$\Sigma$amplitudes $\geq$ averaged$\Sigma$|derivatives|$\times$ K) is found between samples 17 and 32 and 33 and 48 on the time line (the x axis). The bit determination threshold is initially set at 0 volts, for example. The first bit between samples 17 and 32 is determined to be a logic 1 by measuring its average amplitude (over sample periods 17 through 32), and comparing it to the threshold voltage. Say, for example, the average amplitude for this bit is 0.85 volts, and the threshold is 0 volts. Because the average amplitude of this bit is greater than the threshold, the bit is determined to be +1 (i.e., a logic 1).

The next bit in the sequence, between samples 17 and 32, is also determined to exhibit a substantially "flat top" by satisfying the criteria of the equation stated above. Its average amplitude is also determined and found to be, for example, 0.9 volts. This bit is also determined to be a +1 (a logic 1) since it is greater than the 0 volt threshold previously set. The average amplitudes of the two bits which qualify as "flat tops" are averaged together, that is, (0.9+ 0.85)÷2, to arrive at a new average amplitude for +1 (logic 1), that is, 0.875 volts. Since no −1 (logic 0) "flat top" bits have been detected yet in this example, the old threshold (set initially at 0 volts) is not reset and remains as it was.

The next bit in the data bit stream which lies between samples 49 and 64 is determined not to satisfy the equation mentioned previously and does not, therefore, have a sufficiently "flat top"; therefore, it is not considered in the re-determination of the threshold level.

Similarly, the pulse which lies between sample 65 and 80 is determined to not satisfy the criteria for being a "flat top" bit and it, too, will not be used in the determination of the threshold level.

Assume that the following bit which resides between samples 81 and 96 satisfies the criteria for having a "flat top". The bit is determined to be a −1 (logic 0) based on the old threshold of 0 volts. Its average amplitude is calculated and determined to be −0.8 volts. Now, in the sequence of events, a usable +1 pulse and a usable −1 pulse in the NRZ signal are present. The average value of the +1 pulse was calculated to be 0.875 volts (i.e., the average amplitude for logic 1 determined by averaging the average amplitudes of all +1 "flat top" bits). The value of the −1 pulse (i.e., the "flat top" bit between samples 81 and 96) was measured to be −0.8 volts. This is the −1 (logic 0) average amplitude, which is determined by averaging together the average bit amplitudes of all −1 "flat top" bits. The +1 amplitude and the −1 amplitude are now averaged, that is, (0.875−0.8)÷2, to come up with a new threshold level, +0.0375 volts. The demodulator will now adjust the threshold from its original 0 volt level to the new threshold of +0.0375 volts.

Again, referring to FIG. 1 of the drawing, the next bit, which resides between samples 97 and 112, is also determined to have a flat top by satisfying the criteria set forth in the equation described previously. This bit is also determined to be a −1 (logic 0) by calculating its average amplitude and comparing its average amplitude to the new threshold, +0.0375 volts. The average amplitude of this bit is calculated to be −1.0 volts. A new −1 amplitude is determined by averaging the previous −0.8 amplitude with the −1 amplitude of the new bit, that is, (−0.8+−1.0)÷2, to derive a new average amplitude for −1 (logic 0), that is, −0.9 volts. A new threshold determination is now made.

Using the newest −1 updated value, that is, −0.9 volts, this number is averaged with the previous average amplitude for +1, which was 0.875 volts, that is, (0.875−0.9)÷2, to arrive at a new threshold level of −0.0125 volts. The demodulator resets the threshold to the new threshold level of −0.0125 volts. The sequence of steps described above continually repeat in order to derive a new threshold used for determining whether each bit in the data bit stream of the NRZ signal is a logic 1 or a logic 0.

It should be understood that the signal shown in FIG. 1 of the drawing does not reflect the true signal envisioned to be received by the demodulator of the GMSK system, after the gaussian pre-filter. The true signal is expected to be corrupted due to noise, fading and distortion. Accordingly, the scaling factor, K, may be set higher or lower than in a non-corrupted situation such as shown for illustrative purposes in FIG. 1 of the drawing. Also, in the example given above, the criteria for determining a "flat top" bit by satisfying the equation was set very low in order to illustrate how the threshold and the +1 and −1 average amplitudes are determined. A true "flat top" bit signifies the occurrence of a string of successive, same state bits in the data stream of the NRZ signal, and such strings may not be accurately depicted in FIG. 1.

Figure 2:
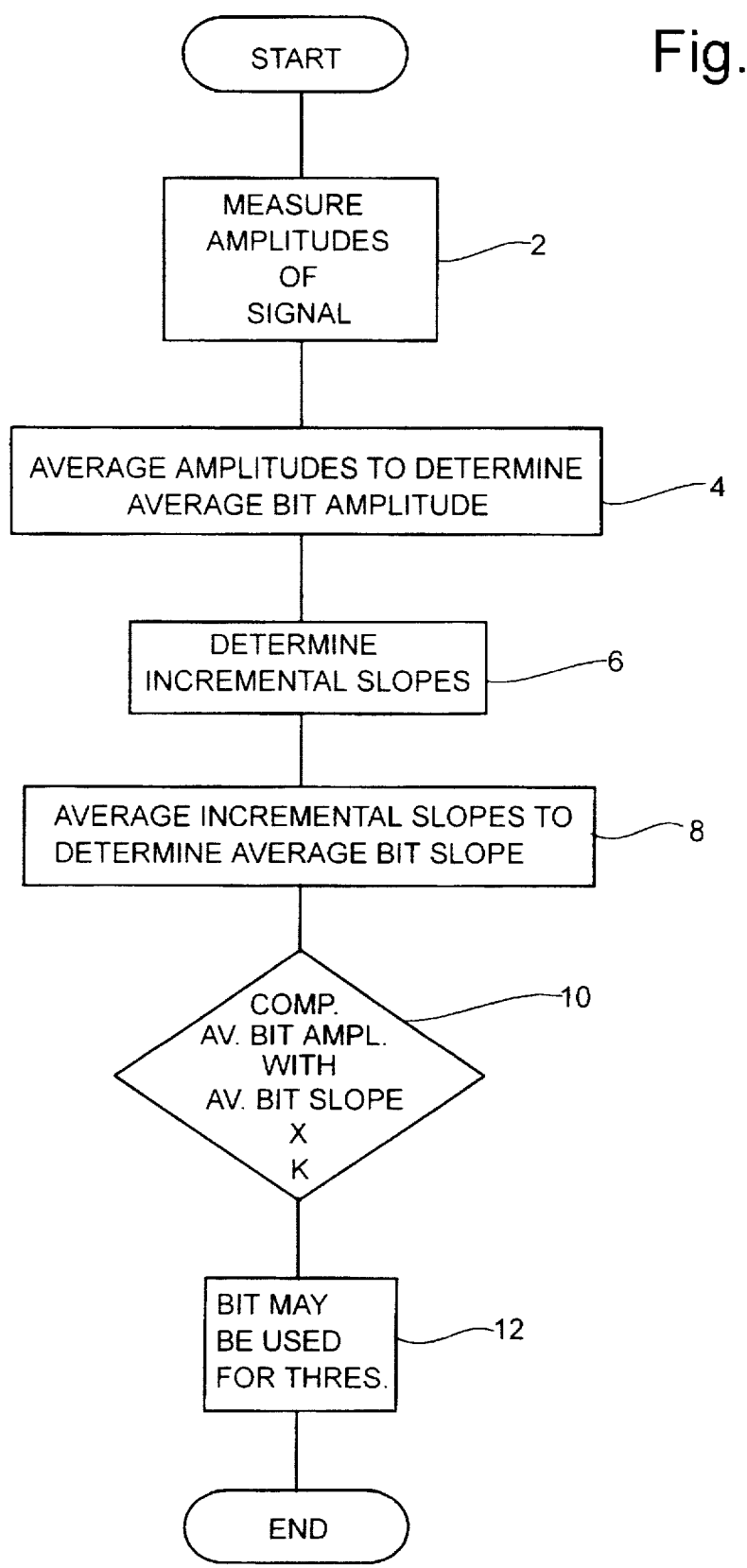
FIG. 2 is a simplified flow chart illustrating the method of the present invention for determining whether a respective bit in a data bit stream of an information signal received by a digital communication system is acceptable for use in setting a bit determination threshold used for determining the logic state of the bits in the data bit stream.

A flow chart which illustrates the method for determining whether a respective bit in the data bit stream of the information signal received by a digital communication system is acceptable for use in setting the bit determination threshold used for determining the logic state of the bits in the data bit stream is shown in FIG. 2.

The first step in the method is to measure the amplitudes of the information signal at N periodic sample times during the respective bit (or another period of time) of the data bit stream (Block 2). This provides N sample amplitudes for each bit, where N is a number greater than 2.

Next, the N sample amplitudes for the respective bit are averaged over one bit period by summing the amplitudes together and dividing the sum by the number of sample in the bit. This yields an average bit amplitude (Block 4). The incremental slopes of the information signal during the respective bit over the N periodic sample times are then determined (Block 6).

The incremental slopes for the respective bit are then averaged to determine an average bit slope (Block 8). The average bit amplitude is compared with the average bit slope for the respective bit to determine whether the bit amplitude sum is less than, equal to or greater than the average bit slope multiplied by the scaling factor, K, where K is a predetermined number greater than 0 (Block 10). Based on this comparison, as mentioned previously, it is determined whether the bit exhibits a sufficiently "flat top" (signify the occurrence of a string of successive same state bits) and may be used in setting the bit determination threshold (Block 12).

Figure 3:
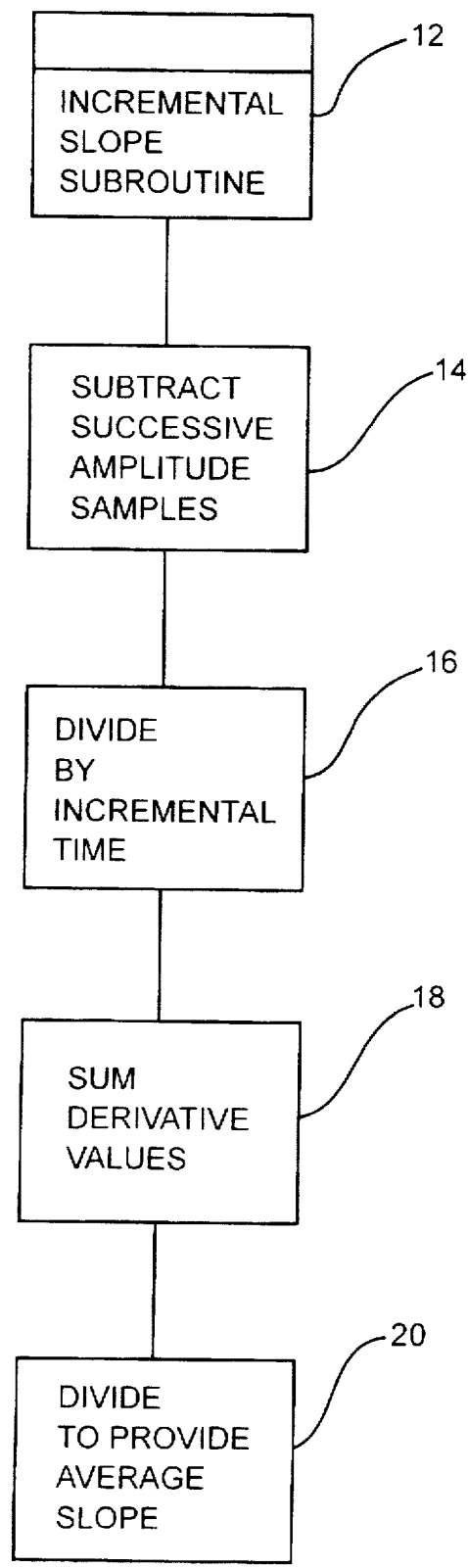
FIG. 3 is a simplified flow chart illustrating the sub-steps used in determining the incremental slopes of an information signal during a respective bit of a data bit stream for an information signal, in accordance with a method of the present invention.

As shown in FIG. 3, the step of determining the incremental slopes of the information signal during the respective bit over the N periodic sample times (Block 6) may be performed in the manner described below. Each sample amplitude is subtracted from a next successive sample amplitude and the absolute value of this difference is taken to provide a plurality of sample amplitude difference values (Block 14). Each amplitude difference value is then divided by the incremental time between bit sample times to provide a plurality of derivative values (Block 16).

The plurality of derivative values are then summed to provide a bit derivative sum (Block 18). The bit derivative sum is then divided by the number of the plurality of derivative values to provide an average bit slope (Block 20).

Figure 4:
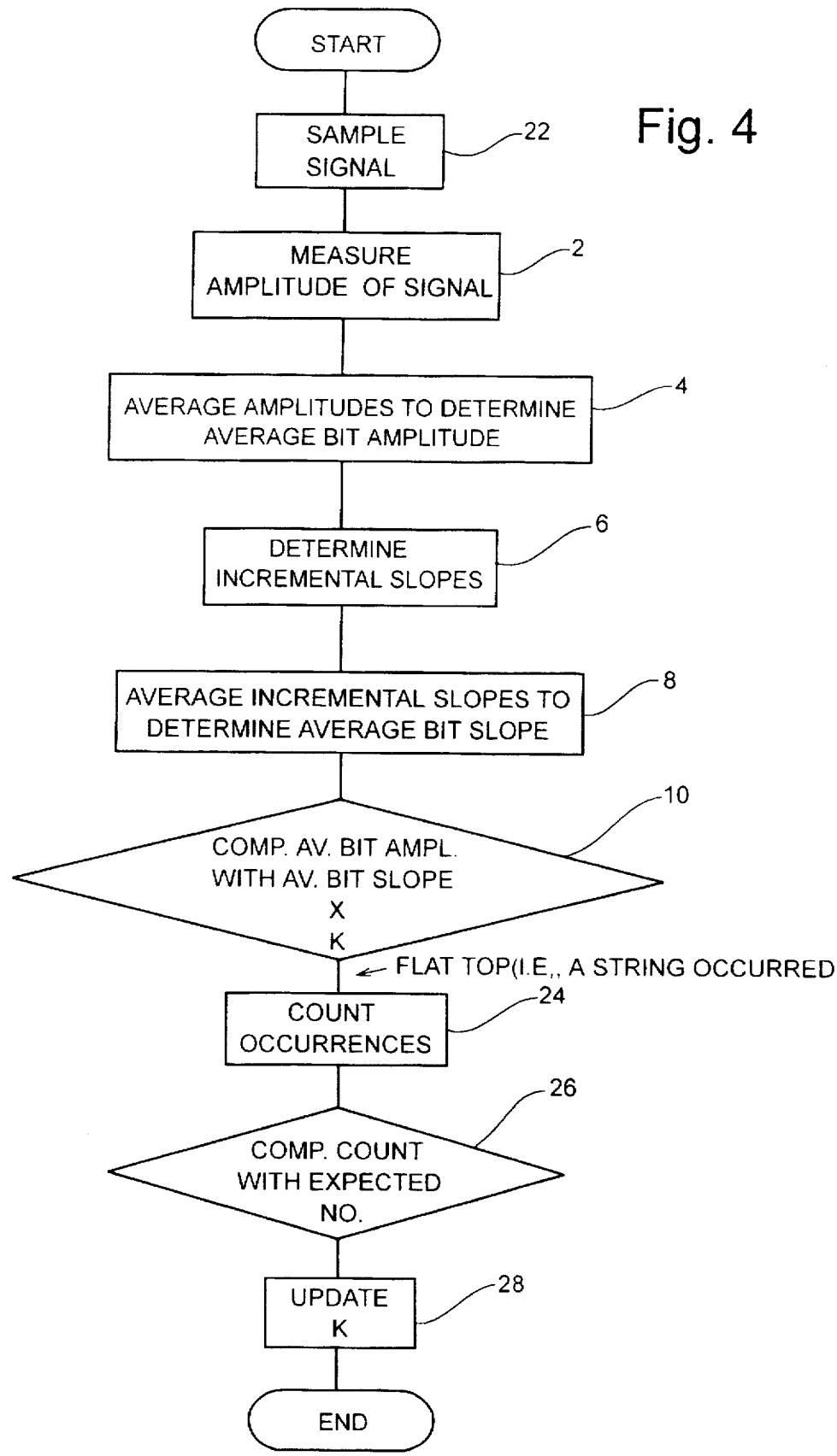
FIG. 4 is a simplified flow chart illustrating the steps used for continually updating the scaling factor, K, used in determining the acceptance of a respective bit in a data bit stream of an information signal received by a digital communication system for use in setting a bit determination threshold used for determining the logic state of bits in the data bit stream, in accordance with the method of the present invention.

A flow chart for the steps used for continually updating the scaling factor, K, used in determining the acceptance of a respective bit in the data bit stream of the information signal received by a digital communication system for use in setting a bit determination threshold used for determining the logic state of bits in the data bit stream is shown in FIG. 4.

The first step is to sample the information signal at periodic sampling times during each bit of the data bit stream (Block 22). Then, a determination is made as to whether the respective bit exhibits a "flat top". This step is performed in the same manner as in the flow chart of FIG. 2, i.e., Blocks 2–10, which are repeated in the flow chart of FIG. 4. A "flat top" bit indicates the occurrence of a string of successive, same state bits.

Next, the number of occurrences of "flat top" bits (which represents strings of M successive same state bits, where M is an integer greater than 1) in a predetermined time period is determined (Block 24). This number is compared with an expected number of occurrences of M successive same state bits for the same predetermined time period based on the probability that such would occur (Block 26).

Finally, the scaling factor, K, is updated based on the comparison which occurred in Block 16 (Block 28).

Figure 5:
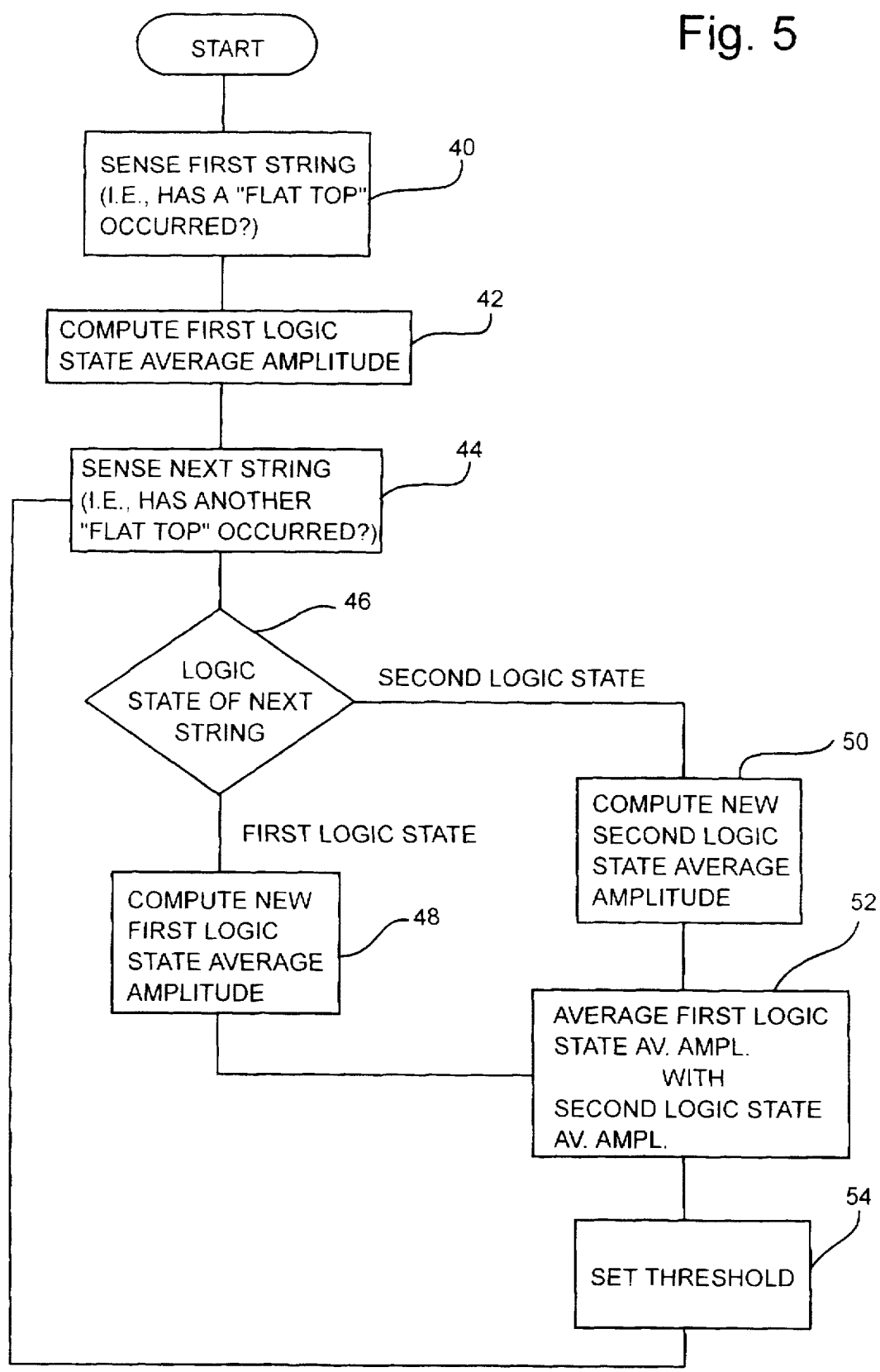
FIG. 5 is a simplified flow chart illustrating a method in accordance with the present invention for setting a bit determination threshold for determining the logic state of a bit in a data bit stream of an information signal received by a digital communication system.

The flow chart shown in FIG. 5 illustrates the method for setting a bit determination threshold for determining the logic state of a bit in the data bit stream of the information signal received by a digital communication system.

The first step is to sense the occurrence of a first string of M successive same state bits in the data bit stream, where M is an integer greater than 1 (Block 40). This step is accomplished by determining if one of the bits in the data bit stream exhibits a sufficiently "flat top", i.e., it satisfies the equation: average bit amplitude≧average bit slope×K, as mentioned previously. A detected "flat top" bit indicates that such a string of successive, same state bits has occurred. The steps for determining if the bit has a sufficiently "flat top" has been described previously and is illustrated by Blocks 2–12 of FIG. 2.

Assume that the bits of the first string correspond to a first logic state, such as logic 1. The average bit amplitude of the detected "flat top" bit corresponding to the first string is assigned to the +1 value (representing a logic 1) for the data bit stream thus far received (Block 42).

Next, the occurrence of a second string of M successive same state bits in the data bit stream is sensed (Block 44). This step is also accomplished in the same manner as with the first string, i.e., by detecting a "flat top" bit associated with the second string. If the bits of the second string had the same logic state (logic 1) as the bits of the first string (Block 46), then the average bit amplitude of the first "flat top" bit (indicating the occurrence of the first string) is averaged with the average bit amplitude of the second "flat top" bit (associated with the second string) and with the average bit amplitude of any other previous (or subsequent) logic 1 (+1) "flat top" bits of other strings to determine a new +1 amplitude value (Block 48). A new bit determination threshold is not set yet, because no strings of opposite polarity bits (i.e., "flat top" logic 0 bits) have been detected.

Assume, however, that the bits of the second string correspond to a second logic state which is logically opposite to the first logic state, in other words, −1 (logic 0). The average bit amplitude of the detected "flat top" bit of the second string is averaged with the average bit amplitudes of any previous or subsequent logic 0 (−1) "flat top" bits to determine a new −1 average amplitude value (Block 50). The +1 (logic 1) average amplitude value is then averaged with the −1 (logic 0) average amplitude value to determine a threshold level (Block 52). The bit determination threshold is set in accordance with the threshold level (Block 54). This sequence repeats for each "flat top" bit detected (return to Block 44).

Figure 6:
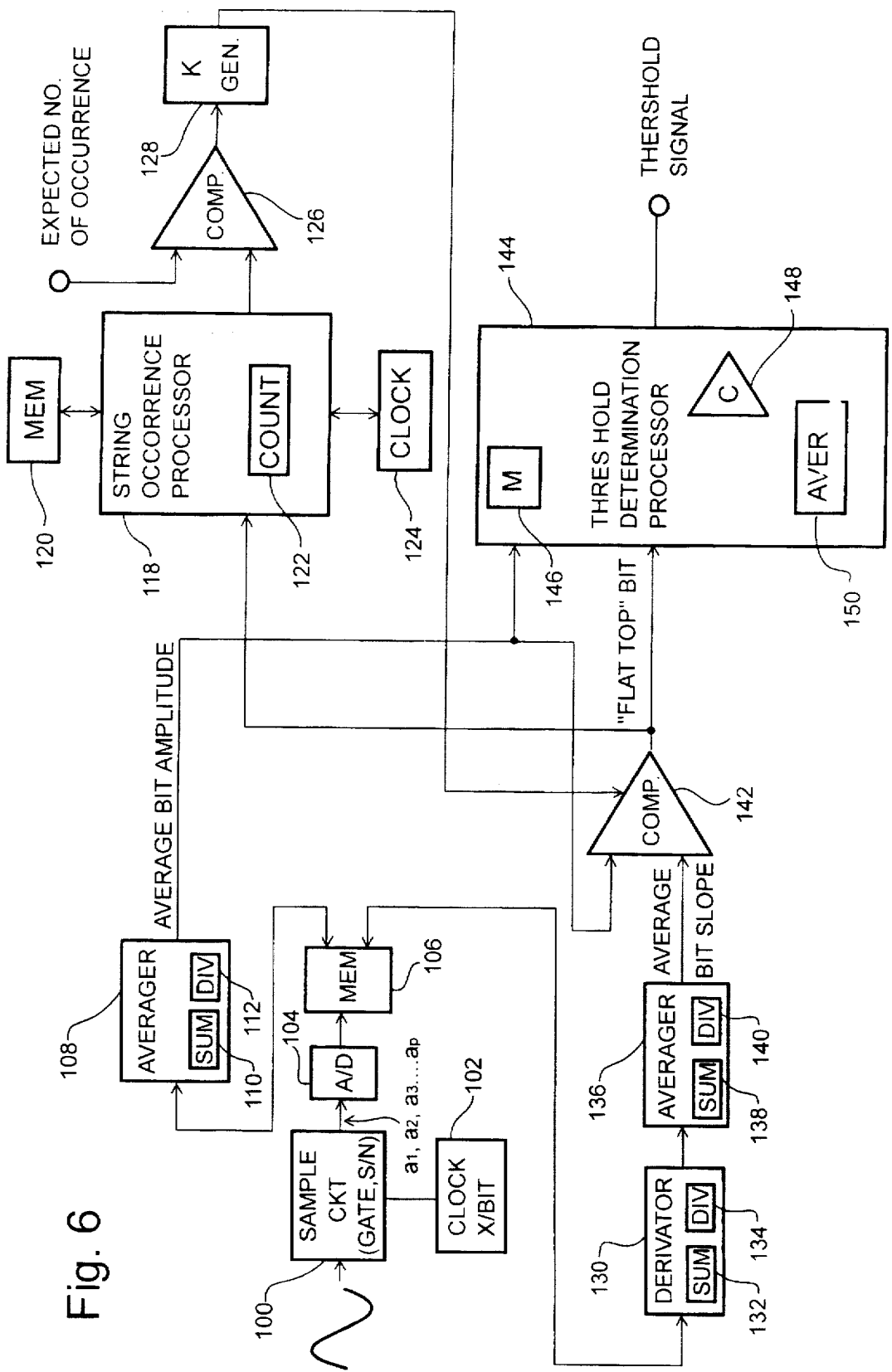
FIG. 6 is a block diagram of one form of a circuit for adaptively setting a bit determination threshold for determining the logic state of a bit in a data bit stream of an information signal received by a digital communication system in accordance with the present invention.

As mentioned previously, the method described above may be carried out by a programmed DSP (digital signal processor) or by an ASIC or discrete circuits. In accordance with the present invention, one form of a circuit which may be used for adaptively setting a bit determination threshold for determining the logic state of a bit in a data bit stream of an information signal received by a digital communication system is shown in FIG. 6 of the drawing.

The information signal containing the data bit stream is provided to a sample circuit 100, such as a gate or a sample and hold circuit, to take samples of each bit of the data bit stream of the information signal. The sample circuit is driven by a clock 102 at a rate of X samples/bit, where X is a number greater than 2 and in accordance with the Nyquist sampling criterion. The sample circuit 100 generates an output signal which comprises a series of sequential voltages or amplitudes $a_1, a_2, a_3 \ldots a_p$, where p is an integer representing the number of samples per bit. The output signal from the sample circuit may be provided to an analog-to-digital (A/D) converter 104.

The A/D converter 104 converts the sequential analog amplitudes of the sample circuit output signal into a digital format, which is provided to a memory circuit 106, such as a register, where such digital data is stored.

The digital data representing the sampled amplitudes of the information signal, per bit of the data bit stream, is provided to an averager circuit 108. The averager circuit 108 includes a summer circuit 110, which sums the individual amplitude samples on a per bit basis.

The averager circuit 108 may also include a divider circuit 112 which divides the sum of the sampled amplitudes by the number of samples taken for that respective bit to generate the average. The averager circuit 108 provides an output signal which corresponds to the average bit amplitude of the information signal for each bit of the data bit stream.

A derivator circuit 130 also takes the preferably digitized amplitude samples $a_1, a_2, a_3 \ldots a_p$ stored in the memory and calculates the slope of the information signal on a per bit basis. The derivator circuit 130 may include a subtractor circuit 132 which subtracts each sample amplitude from a next successive sample amplitude (and takes the absolute value of this difference) to provide a signal corresponding to a plurality of sample amplitude, absolute value difference values. The signal (i.e., sample amplitude difference values) is preferably provided to a divider circuit 134 of the derivator which divides each sample amplitude difference value by the incremental time between periodic sample times. The derivator circuit 130 generates an output signal which corresponds to a plurality of derivative values representing the incremental slope of the information signal at each bit of the data bit stream.

The next step in the process is to compare the averaged sum of the sample amplitudes, per bit (i.e., the average bit amplitude), with the average of the incremental slopes of the information signal for the same bit (i.e., the average bit slope). The output signal from the derivator circuit 130, which corresponds to the plurality of derivative values, is provided to an averager circuit 136 which may include a summer circuit 138 and a divider circuit 140. The summer circuit 138 will add together the plurality of derivative values determined by the derivator circuit 130 to provide a bit derivative sum signal, and provides the bit derivative sum signal to the divider circuit 140, which divides the bit derivative sum by the number of derivative values, again on a per bit basis. The averager circuit 136 generates an output signal which corresponds to an average bit slope.

A first comparator 142 compares the output signal of the slope averager circuit 136, i.e., corresponding to the average bit slope, with the output signal of the amplitude averager circuit 108, i.e., corresponding to the average bit amplitude, and determines whether the average bit amplitude is less than, equal to or greater than the average bit slope multiplied by the scaling factor, K, provided to it by the output signal from a K generator 128, as will be described. Based on this comparison, it may be determined that a respective bit in the data bit stream of the information signal has a sufficiently "flat top" and is acceptable for use in setting the bit determination threshold.

At this point, the portion of the circuit which is used to generate the scaling factor, K, will now be described. The output signal of the first comparator 142, which indicates the occurrence of a "flat top" bit in the data bit stream of the NRZ signal, is provided to an input port of a bit string occurrence processor/counter 118. Processor/counter 118 may have associated therewith, either externally or internally, a memory 120, a counter 122 and a clock 124, which will work in conjunction with the processor/counter 118. Processor/counter 118 counts the number of "flat top" symbols occurring in a predetermined period of time, for example, 100 bit periods. The processor/counter 118 provides an output signal indicative of this count to a second comparator 126.

Comparator 126 receives the output signal from the processor 118 and also a preselected signal which corresponds to the expected number of occurrences of strings of M successive same state bits for the same predetermined time period based on the probability of occurrences, where M is an integer greater than 1. The comparator 126 compares the signal from the processor 118 (corresponding to the number of actual occurrences of same state bit strings indicated by detected "flat top" symbols) with the signal which corresponds to the expected number of occurrences, and generates an output signal in response to this comparison. The output signal from the comparator 126 is provided to a generator 128 which generates the scaling factor K. The "K generator" 128 will increase or decrease the scaling factor, K, in response to the output signal from the comparator 126, and will generate an output signal which corresponds to the scaling factor, K. This output signal is provided to comparator 142.

An output signal from the comparator 142 is provided to a processor 144 used for determining the threshold. Also provided to the threshold determination processor 144 is the signal from the amplitude averager circuit 108, which corresponds to the average amplitude of a respective bit in the data bit stream. The processor 144 may also include a memory 146, a comparator 148 and an internal averager circuit 150 for its operation.

The threshold determination processor 144 takes the average bit amplitude information carried by the output signal of the amplitude averager circuit 108 and, with its internal comparator 148, compares the average bit amplitude with the currently set bit determination threshold for each "flat top" bit to determine if the respective bit is a logic 1 or logic 0. Processor 144 then sums together and averages (using its internal averager circuit 150) the averager bit amplitudes of all "flat top" +1 (logic 1) bits, and does the same for all "flat top" −1 (logic 0) bits, separately from the +1 bits, to determine new +1 (logic 1) average amplitudes and −1 (logic 0) average amplitudes for data bits of the data bit stream which were determined to have "flat tops" by passing the criteria set up by the equation, average bit amplitude≧average bit slope×K, described previously. The processor 144 will use its internal averager circuit 150 to average the average +1 amplitude with the average −1 amplitude to generate a new bit determination threshold level. The output signal of the threshold determination processor 144, which corresponds to a continually updated threshold level, is used by the demodulator circuit in setting the bit determination threshold.

It should be understood that the circuit shown in FIG. 6 may be formed from discrete components, or integrated into an ASIC. Alternatively, as mentioned previously, a programmed DSP may be used to carry out the method of the present invention. It is further envisioned that each of the component circuits described above may be controlled by a microprocessor to carry out the method of the present invention described previously.

The method and circuit of the present invention advantageously allows the threshold used for bit state determination to be adaptively controlled. A relatively shorter period of time, or number of bits, of the data bit stream may be used in determining the proper threshold than would be conventionally done. The method is quite suitable for use with GMSK or GFSK systems, and overcomes the storage effect associated with a gaussian pre-filter of the GMSK or GFSK system, allowing the bit detection threshold level to be adjusted in a relatively short period of time.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for setting a bit determination threshold for determining the logic state of a bit in a data bit stream of an information signal received by a digital communication system, which comprises the steps of:

a) sensing the occurrence of a first bit in the data bit stream, the first bit corresponding to a first logic state, the first bit having an average bit amplitude and an average bit slope associated therewith, the average bit amplitude of the first bit being at least equal to the average bit slope of the first bit multiplied by a scaling factor, K, where K is a predetermined number greater than 0;

b) sensing the occurrence of a second bit in the data bit stream occurring subsequent to the first bit, the second bit corresponding to a second logic state which is logically opposite to the first logic state of the first bit, the second bit having associated therewith an average bit amplitude and an average bit slope, the average bit amplitude of the second bit being at least equal to the average bit slope of the second bit multiplied by the scaling factor K;

c) averaging the average bit amplitude of the first bit with the average bit amplitude of the second bit to determine a first threshold level; and d) setting the bit determination threshold in accordance with the first threshold level.

2. A method for setting a bit determination threshold for determining the logic state of a bit in a data bit stream of an information signal received by a digital communication system, which comprises the steps of:

a) sensing the occurrence of a first bit in the data bit stream, the first bit corresponding to a first logic state and having an average bit amplitude and an average bit slope associated therewith, the average bit amplitude of the first bit being at least equal to the average bit slope of the first bit multiplied by a scaling factor, K, where K is a predetermined number greater than 0;

b) sensing the occurrence of a second bit in the data bit stream occurring subsequent to the first bit, the second bit corresponding to the same first logic state as the first bit, the second bit having an average bit amplitude and an average bit slope associated therewith, the average bit amplitude of the second bit being at least equal to the average bit slope of the second bit multiplied by the scaling factor K;

c) averaging the average bit amplitude of the first bit with the average bit amplitude of the second bit occurring in time to provide a first logic state average amplitude;

d) sensing the occurrence of a third bit in the data bit stream occurring subsequent to the second bit and corresponding to a second logic state which is logically opposite to the first logic state, the third bit having an average bit amplitude and an average bit slope associated therewith, the average bit amplitude of the third bit being at least equal to the average bit slope of the third bit multiplied by the scaling factor K;

e) averaging the first logic state average amplitude with the average bit amplitude of the third bit to determine a first threshold level;

f) setting the bit determination threshold in accordance with the first threshold level.

3. A method as defined by claim 2, which comprises the further steps of:

g) after step f), sensing the occurrence of a fourth bit in the data bit stream occurring subsequent to the third bit, the fourth bit corresponding to the same first logic state as the first and second bits, the fourth bit having an average bit amplitude and an average bit slope associated therewith, the average bit amplitude of the fourth bit being at least equal to the average bit slope of the fourth bit multiplied by the scaling factor K;

h) averaging the average bit amplitudes of the first, second and fourth bits to re-determine the first logic state average amplitude;

i) averaging the re-determined first logic state average amplitude with the average bit amplitude of the third bit to determine a second threshold level; and j) setting the bit determination threshold in accordance with the second threshold level.

4. A method as defined by claim 2, which comprises the further steps of:

g) after step f), sensing the occurrence of a fourth bit in the data bit stream occurring subsequent to the third bit, the fourth bit corresponding to the same second logic state as the third bit, the fourth bit having an average bit amplitude and an average bit slope associated therewith, the average bit amplitude of the fourth bit being at least equal to the average bit slope of the fourth bit multiplied by the scaling factor K;

h) averaging the average bit amplitudes of the third and fourth bits to determine a second logic state average amplitude;

i) averaging the first logic state average amplitude with the second logic state average amplitude to determine a second threshold level; and j) setting the bit determination threshold in accordance with the second threshold level.

5. A method for determining whether a respective bit in a data bit stream of an information signal received by a digital communication system is acceptable for use in setting a bit determination threshold used for determining the logic state of bits in the data bit stream, which comprises the steps of:

a) measuring the amplitudes of the information signal at N periodic sample times during the respective bit of the data bit stream to provide N sample amplitudes for each bit, N being a number at least equal to 2;

b) averaging the N sample amplitudes for the respective bit to determine an average bit amplitude;

c) determining incremental slopes of the information signal during the respective bit over the N periodic sample times;

d) averaging the incremental slopes for the respective bit to determine an average bit slope; and e) comparing the average bit amplitude with the average bit slope for the respective bit and determining whether the average bit amplitude is at least one of less than, equal to and greater than the average bit slope multiplied by a scaling factor, K, where K is a predetermined number greater than 0.

6. A method as defined by claim 5, wherein the step of c) for determining incremental slopes of the information signal includes the sub-steps of:

c1) subtracting each sample amplitude from a next respective successive sample amplitude to provide a plurality of sample amplitude difference values; and c2) dividing each sample amplitude difference value by the incremental time between periodic sample times.

7. A method as defined by claim 5, wherein the steps c) and d) for respectively determining and averaging the incremental slopes of the information signal include the sub-steps of:

c1) subtracting each sample amplitude from a next respective successive sample amplitude to provide a plurality of sample amplitude difference values; and c2) dividing each sample amplitude difference value by the incremental time between periodic sample times to provide a plurality of derivative values;

d1) summing the plurality of derivative values to provide a bit derivative sum; and d2) dividing the bit derivative sum by the number of the plurality of derivative values to provide an average bit slope.

8. A method for continually updating a scaling factor, K, used in determining the acceptance of a respective bit in a data bit stream of an information signal received by a digital communication system for use in setting a bit determination threshold used for determining the logic state of bits in the data bit stream, which comprises the steps of:

a) measuring the amplitudes of the information signal at N periodic sample times during the respective bit of the data bit stream to provide N sample amplitudes for each bit, N being a number at least equal to 2;

b) averaging the N sample amplitudes for the respective bit to determine an average bit amplitude;

c) determining incremental slopes of the information signal during the respective bit over the N periodic sample times;

d) averaging the incremental slopes for the respective bit to determine an average bit slope;

e) comparing the average bit amplitude with the average bit slope for each respective bit and determining whether the average bit amplitude at least equals the average bit slope multiplied by a scaling factor, K, where K is a predetermined number greater than 0;

f) counting the number of bits for which the average bit amplitude is at least equal to the average bit slope multiplied by the scaling factor, K, occurring in a predetermined time period;

g) comparing the number of occurrences counted in step f) with an expected number of occurrences for the same predetermined time period based on the probability of occurrences; and h) updating the scaling factor, K, on the basis of the comparison in step g).

9. Apparatus for updating a scaling factor, K, used in determining the acceptance of a respective bit in a data bit stream of an information signal received by a digital communication system for use in setting a bit determination threshold used for determining the logic state of bits in the data bit stream, which comprises:

a sampling circuit, the sampling circuit sampling the information signal at periodic sampling times during each bit of the data bit stream, the sampling circuit providing an output signal in response thereto;

an amplitude measuring circuit, the amplitude measuring circuit being responsive to the output signal of the sampling circuit and effectively measuring the amplitudes of the information signal at the sampling times, the amplitude measuring circuit providing an output signal in response thereto;

an amplitude averaging circuit, the amplitude averaging circuit being responsive to the output signal of the amplitude measuring circuit and determining the average bit amplitude of the information signal for each bit of the data bit stream, the amplitude averaging circuit providing an output signal corresponding to the average bit amplitude;

a derivator circuit, the derivator circuit being responsive to the output signal of the amplitude measuring circuit and determining incremental slopes of the information signal during the respective bit over the periodic sampling times, the derivator circuit providing an incremental slope output signal in response thereto;

a slope averaging circuit, the slope averaging circuit being responsive to the incremental slope output signal and averaging the incremental slopes for the respective bit to determine an average bit slope, the slope averaging circuit providing an output signal corresponding to the average bit slope; and a first comparator, the first comparator being responsive to the output signal of the slope averaging circuit corresponding to the average bit slope and the output signal of the amplitude averaging circuit corresponding to the average bit amplitude and effectively comparing the average bit amplitude with the average bit slope for the respective bit and determining whether the average bit amplitude is at least one of less than, equal to and greater than the average bit slope multiplied by a scaling factor, K, where K is a predetermined number greater than 0, the first comparator providing an output signal in response to the comparison thereof;

a counter circuit, the counter circuit being responsive to the output signal of the first comparator for determining the number of occurrences of bits in a predetermined time period for which the average bit amplitude of the bit is at least equal to the average bit slope multiplied by the scaling factor K, the counter circuit generating an output signal corresponding to the number of occurrences of said bits;

a second comparator, the second comparator being responsive to the output signal of the counter circuit and comparing the number of occurrences of said bits counted by the counter circuit with an expected number of occurrences of said bits for the same predetermined time period based on the probability of occurrences, the second comparator providing an output signal in response to the comparison thereof;

wherein the scaling factor, K, is updated on the basis of the comparison performed by the second comparator.

10. Apparatus for determining whether a respective bit in a data bit stream of an information signal received by a digital communication system is acceptable for use in setting a bit determination threshold used for determining the logic state of bits in the data bit stream, which comprises:

an amplitude measuring circuit, the amplitude measuring circuit being responsive to the information signal and measuring the amplitudes of the information signal at N periodic sample times during the respective bit of the data bit stream, the amplitude measuring circuit providing an output signal corresponding to N sample amplitudes for each bit, N being a number at least equal to 2;

an amplitude averaging circuit, the amplitude averaging circuit being responsive to the output signal of the amplitude measuring circuit and determining the average amplitude of the information signal for each bit of the data bit stream, the amplitude averaging circuit providing an output signal corresponding to the average bit amplitude;

a derivator circuit, the derivator circuit being responsive to the output signal of the amplitude measuring circuit and determining incremental slopes of the information signal during the respective bit over the N periodic sample times, the derivator circuit providing an incremental slope output signal in response thereto;

a slope averaging circuit, the slope averaging circuit being responsive to the incremental slope output signal and averaging the incremental slopes for the respective bit to determine an average bit slope, the slope averaging circuit providing an output signal corresponding to the average bit slope; and a comparator, the comparator being responsive to the output signal of the slope averaging circuit corresponding to the average bit slope and the output signal of the amplitude averaging circuit corresponding to the average bit amplitude and effectively comparing the average bit amplitude with the average bit slope for the respective bit and determining whether the average bit amplitude is at least one of less than, equal to and greater than the average bit slope multiplied by a scaling factor, K, where K is a predetermined number greater than 0.

11. Apparatus as defined by claim 10, wherein the derivator circuit includes:

a subtractor circuit, the subtractor circuit being responsive to the output signal of the amplitude measuring circuit and effectively subtracting each sample amplitude from a next successive sample amplitude of the respective bit to provide a plurality of sample amplitude difference values, the subtractor circuit providing an output signal which corresponds to the sample amplitude difference values; and a divider circuit, the divider circuit being responsive to the output signal of the subtractor circuit and effectively dividing each sample amplitude difference value by the incremental time between periodic sample times.

12. Apparatus as defined by claim 10, wherein the derivator circuit and the slope averaging circuit for respectively determining and averaging the incremental slopes of the information signal include:

a subtractor circuit, the subtractor circuit being responsive to the output signal of the amplitude measuring circuit and effectively subtracting each sample amplitude from a next successive sample amplitude of a respective bit to provide a plurality of sample amplitude difference values, the subtractor circuit providing an output signal corresponding to the sample amplitude difference values;

a first divider circuit, the first divider circuit being responsive to the output signal of the subtractor circuit and effectively dividing each sample amplitude difference value by the incremental time between periodic sample times to provide a plurality of derivative values, the first divider circuit providing an output signal corresponding to the plurality of derivative values;

a summing circuit, the summing circuit being responsive to the output signal of the divider circuit and effectively summing the plurality of derivative values to provide a bit derivative sum, the summing circuit providing an output signal corresponding to the bit derivative sum; and a divider circuit, the divider circuit being responsive to the output signal of the summing circuit and effectively dividing the bit derivative sum by the number of the plurality of derivative values to provide an average bit slope, the divider circuit providing an output signal corresponding to the average bit slope.

13. Apparatus for setting a bit determination threshold for determining the logic state of a bit in a data bit stream of an information signal received by a digital communication system, which comprises:

a string occurrence sensing circuit, the string occurrence sensing circuit being responsive to the information signal and sensing the occurrence of a first string of M successive same state bits in the data bit stream and sensing the occurrence of a second string of M successive same state bits occurring subsequent to the first string, M being an integer greater than 1, the bits of the first string corresponding to a first logic state and the bits of the second string corresponding to a second logic state which is logically opposite to the first logic state, the string occurrence sensing circuit generating an output signal in response to sensing the occurrence of the first and second strings, the string occurrence sensing circuit including:

an average bit amplitude determining circuit, the average bit amplitude determining circuit being responsive to the information signal and effectively determining the average amplitude of the information signal corresponding to at least a first bit of the first string and at least a second bit of the second string, the average amplitude determining circuit providing an output signal corresponding to the average bit amplitude of each of the at least first and second bits of the first and second strings;

an average bit slope determining circuit, the average bit slope determining circuit being responsive to the information signal and effectively determining an average slope of the information signal corresponding to the at least first bit of the first string and the at least second bit of the second string, the average bit slope determining circuit providing an output signal corresponding to the average bit slope of each of the at least first and second bits of the first and second strings; and a comparator circuit, the comparator circuit being responsive to the average bit amplitude determining circuit and the average bit slope determining circuit and effectively comparing the output signal of the average bit amplitude determining circuit corresponding to the average bit amplitude with the output signal of the average bit slope determining circuit corresponding to the average bit slope multiplied by a scaling factor, K, where K is a predetermined number greater than 0, for each of the at least first and second bits of the first and second strings;

an averaging circuit, the averaging circuit being responsive to the output signal of the average bit amplitude determining circuit and effectively averaging the average bit amplitude of the at least first bit of the first string with the average bit amplitude of the at least second bit of the second string to provide an output signal corresponding to a first threshold level;

whereby the digital communication system sets the bit determination threshold in response to the output signal of the averaging circuit.

* * * * *